United States Patent [19]

Thorne et al.

[11] Patent Number: 4,898,464
[45] Date of Patent: Feb. 6, 1990

[54] METHOD AND APPARATUS FOR DETERMINING THE POSITION OF AN OBJECT

[75] Inventors: Glenn A. Thorne; Robert D. Joy; Jeff A. Simpson, all of Cedar Rapids, Iowa

[73] Assignee: Bee Line Company, Bettendorf, Iowa

[21] Appl. No.: 91,601

[22] Filed: Aug. 31, 1987

[51] Int. Cl.⁴ .................. G01B 11/26; G01C 21/06
[52] U.S. Cl. .................. 356/152; 33/203.18; 33/203.19; 33/203.20; 33/288; 356/150; 250/214 B
[58] Field of Search .............. 356/150, 141, 152; 33/288, 203.15, 203.16, 203.17, 203.18, 203.19, 203.20; 250/214 B

[56] References Cited

U.S. PATENT DOCUMENTS

| | | | |
|---|---|---|---|
| 3,901,604 | 8/1975 | Butler | 356/152 |
| 4,138,825 | 2/1979 | Pelta | 33/288 |
| 4,274,735 | 6/1981 | Tamura et al. | 250/214 B |
| 4,319,838 | 3/1982 | Grossman et al. | 356/152 |
| 4,336,658 | 6/1982 | January et al. | 33/288 |
| 4,500,201 | 2/1985 | Lill | 356/152 |

Primary Examiner—Stephen C. Buczinski
Attorney, Agent, or Firm—Hovey, Williams, Timmons & Collins

[57] ABSTRACT

A system and method are provided using a photodetector array for producing an output signal which is compensated for the effects of ambient light, photodetector bias, and the like, wherein the output signal contains information indicative of the position of the object. The preferred embodiment is useful for vehicular wheel alignment and includes left and right wheel units for coupling to respective left and right steerable wheels of a vehicle, and a central microcomputer and CRT display operably coupled with each wheel unit. Each preferred wheel unit includes a photodetector array operably connected to a wheel unit microcomputer and a laser beam source directing a laser beam toward the array of the other wheel unit. In use, the central microcomputer turns each laser off and on, whereupon the wheel unit microcomputers store corresponding sets of data and produce respective output signals indicative of the impingement location of each laser beam on the respective arrays which signals are compensated for the effects of ambient light, detector bias, and the like.

15 Claims, 6 Drawing Sheets

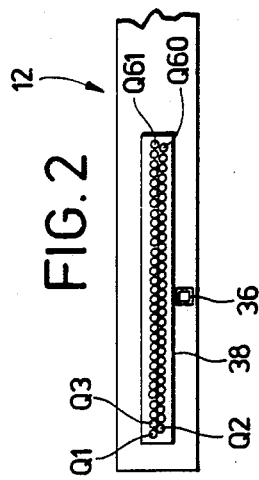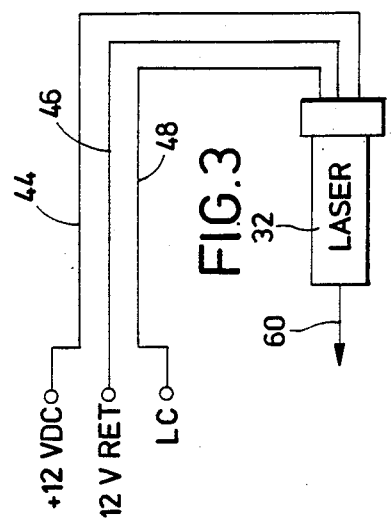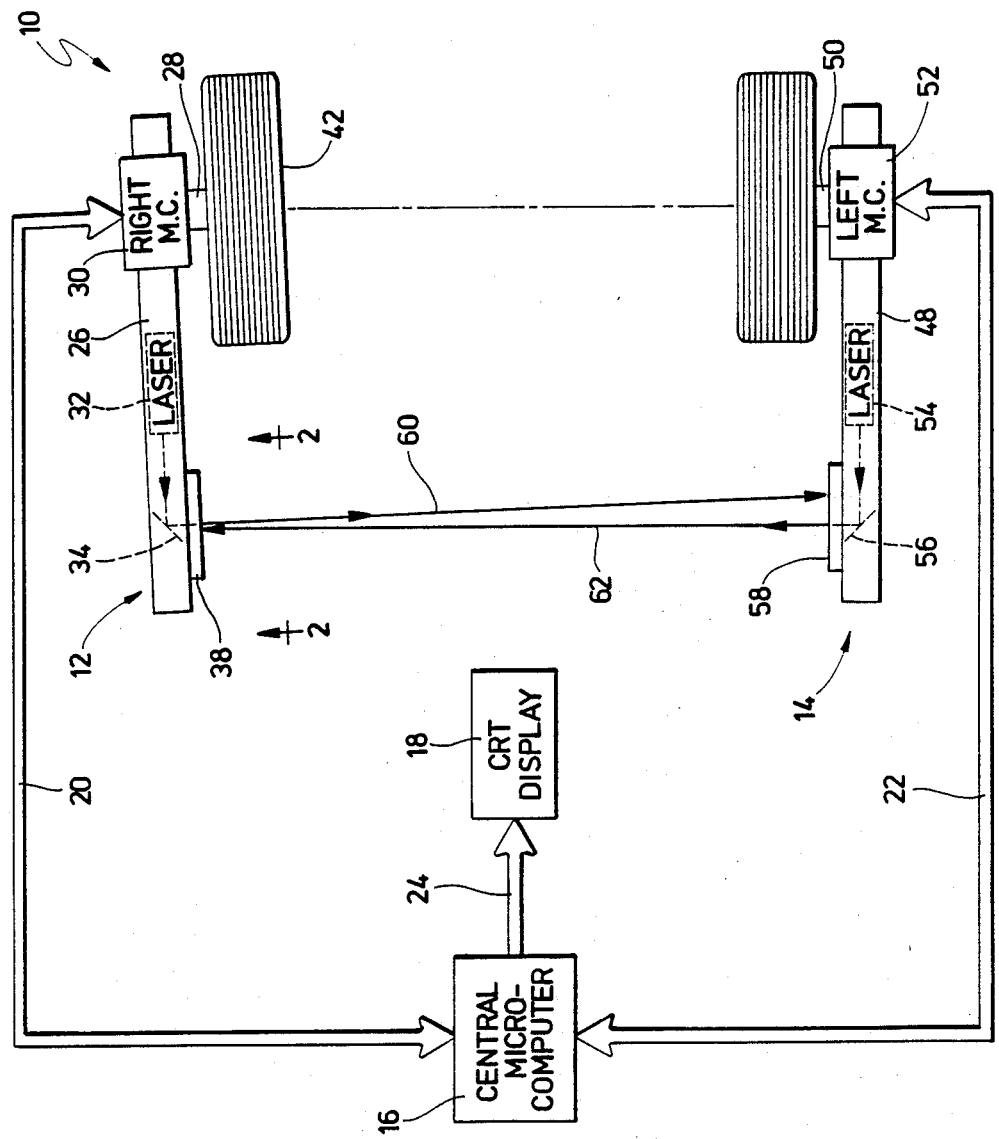

METHOD AND APPARATUS FOR DETERMINING THE POSITION OF AN OBJECT

BACKGROUND OF THE INVENTION

1. Field of the Invention

The present invention is concerned with an apparatus and method for determining the position of an object. More particularly, the present invention is concerned with a device for aligning the steerable wheels of a vehicle which uses a laser beam source coupled to one steerable wheel, a phototransistor array coupled to the other steerable wheel, and a microcomputer coupled to the array for producing an output signal representative of the relative position of the two wheels compensated for the effects of ambient light, phototransistor bias, and the like.

2. Description of the Prior Art

The prior art discloses systems for determining the position of an object which are particularly useful for the alignment of one steerable wheel of a vehicle relative to another steerable wheel or relative to the centerline of the vehicle frame. In particular, some of these systems for vehicular wheel alignment use beams of visible light, such as laser beams, and an associated photodetector. Such combinations are advantageous in that the use of a light beam eliminates the need for measuring tapes or strings. Photodetectors, however, are subject to undesirable signal bias caused by ambient light, internal photodetector bias, and the like.

U.S. Pat. Nos. 4,150,897, and 4,311,386, which are hereby incorporated by reference, disclose devices which attempt to compensate for photodetector signal bias. Both disclose devices which cause a beam of light to sweep across the area of an associated photodetector to thereby produce a modulated signal which can be filtered from the background signal bias in order to determine the toe angle of the respective steerable wheels of a vehicle. The use of a mechanical device to sweep a beam of light across a beam detector, however, tends to be complex and pre-sents the potential for mechanical failure.

Accordingly, the prior art points out the need for an apparatus for accurately determining the position of an object without the use of a mechanical device to sweep or modulate a beam of light.

SUMMARY OF THE INVENTION

The apparatus and method of the present invention satisfy the needs pointed out by the discussion above by providing a highly accurate system for determining the position of an object without using a mechanical device for sweeping a beam of light across a photodetector.

The preferred embodiment of the invention hereof is advantageously used in the context of a vehicular wheel alignment system and includes first and second wheel units which are mounted to respective steerable wheels of a vehicle. Each wheel unit includes a laser beam source and a phototransistor array, and is mounted to a respective steerable wheel so that the laser beam impinges on the array of the other wheel unit. Each wheel unit further includes a microcomputer which receives detector signals from the individual detectors of the arrays, processes the signals to eliminate the effects of ambient light, detector bias, or the like, and produces a digital output signal which is representative of the impingement location of the beam relative to the array.

The respective output signals from each wheel unit are transmitted to a central microcomputer which processes the two output signals in order to produce a cathode ray tube display which displays the relative toe in/toe out of the steerable wheels. Using this information, the system operator can then make the adjustments in the steerable wheels necessary to bring the wheels into alignment.

More particularly, main microcomputer is operably coupled with each laser and it is programmed to periodically turn off the respective laser beams whereupon the respective wheel unit microcomputer place a first set of values in memory indicative of the detector output when the laser beams are off. The central microcomputer then turns the laser beams back on and the respective wheel unit microcomputers then place a second set of values in memory indicative of the detector signals when the laser beam is on. The wheel unit microcomputers then determine the difference between the respective first and second sets of values. The differences are representative of detector signals without the effects of ambient light, detector bias, or the like.

Further processing produces a third set of values which are also placed into memory and which indicate in digital format upon which of the detectors the laser beams are impinging. The wheel unit microcomputers then produce respective digital output signals based on the third set of values which the central microcomputer uses to calculate the toe angle of the steerable wheels for display.

BRIEF DESCRIPTION OF THE DRAWINGS

FIG. 1 is a plan view in partial schematic of the preferred embodiment of the present invention in use for aligning the front steerable wheels of a vehicle;

FIG. 2 is a partial elevational view of a wheel unit of FIG. 1 showing a phototransistor array and an output opening for a laser beam;

FIG. 3 is an electrical schematic of a control circuit for the lasers of FIG. 1;

DESCRIPTION OF THE PREFERRED EMBODIMENTS

Figure 4:
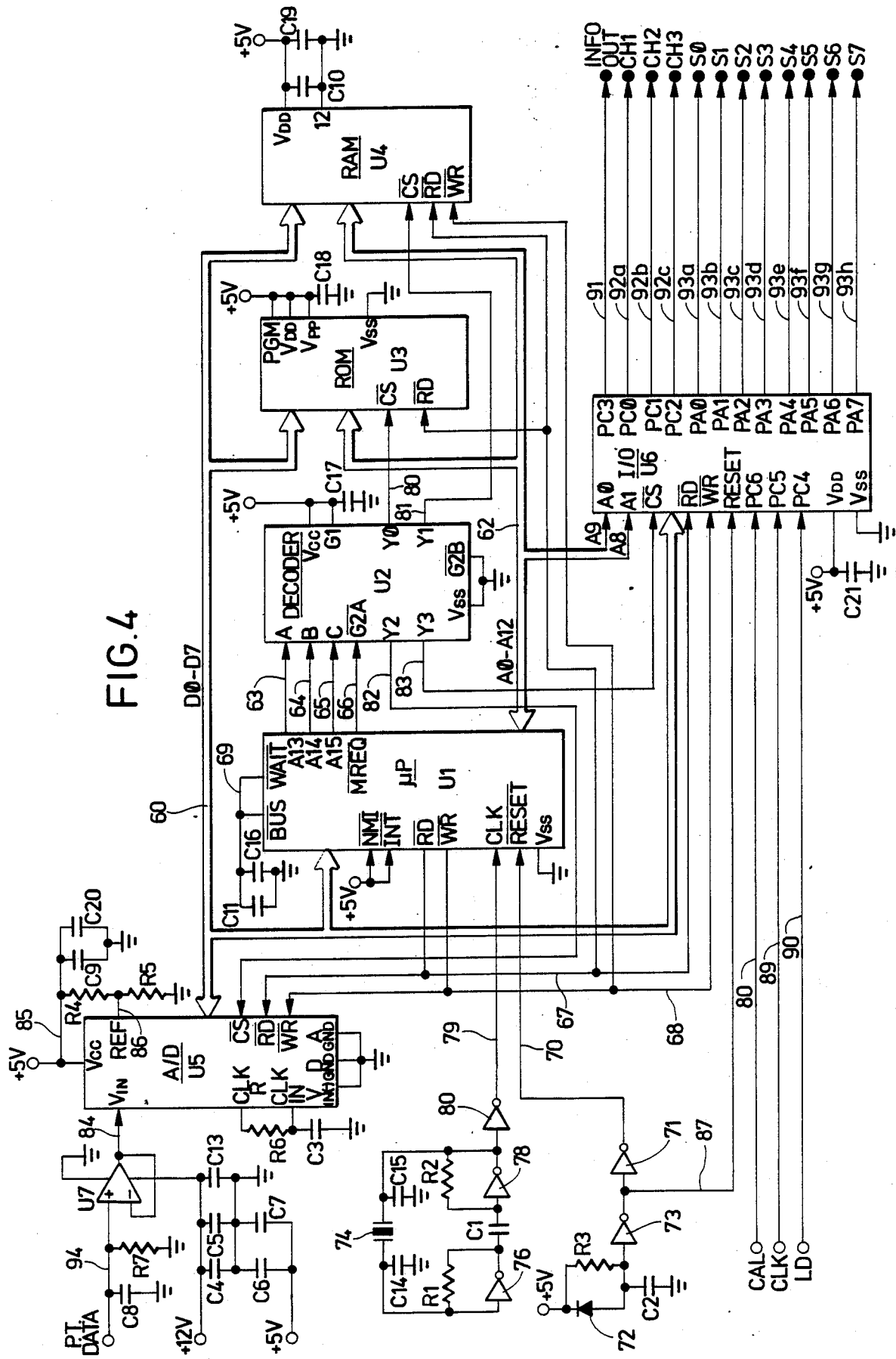
FIG. 4 is an electrical schematic diagram of part of the right unit microcomputer circuit of FIG. 1.

FIG. 1 illustrates the preferred embodiment of apparatus 10 in accordance with the present invention and broadly includes right wheel unit 12, left wheel unit 14, central microcomputer 16, cathode ray tube (CRT) display 18, right connection cable 20 electrically interconnecting right wheel unit 12 and computer 16, left connection cable 22 electrically interconnecting left wheel unit 14 and computer 16, and CRT connection cable 24 electrically interconnecting computer 16 and CRT 18.

Right wheel unit 12 includes tubular housing 26, wheel clamp 28, right unit microcomputer 30, laser 32, mirror 34, laser output aperture 36 (FIG. 2), and phototransistor array 38.

Tubular housing 26 is preferably composed of sheet metal and presents a rectangular cross section. Conventional wheel clamp 28 couples right wheel unit 12 to the right steerable wheel 42 of the vehicle.

Figure 5:
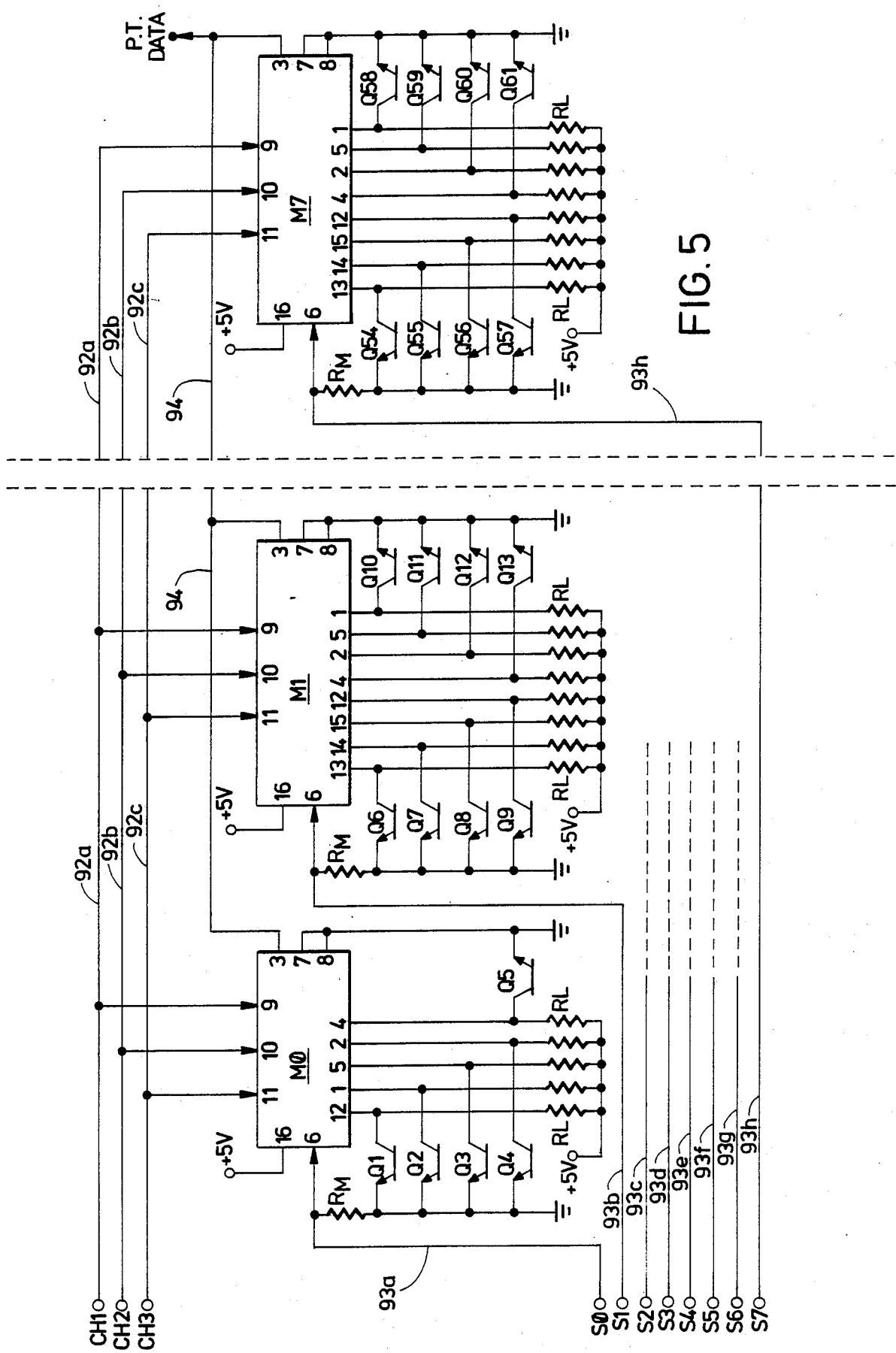
FIG. 5 is an electrical schematic diagram of the balance of the right unit microcomputer circuit of FIG. 4 associated with the phototransistors of FIG. 2.

Right unit microcomputer 30 is schematically illustrated in FIGS. 4 and 5 and will be discussed further hereinbelow. Computer 30 is electrically interconnected with each of the phototransistors in array 38 by electrical lines (not shown in FIG. 1) running internally through housing 26.

Laser 32 is preferably a helium neon laser Model No. 05-LHR-011 manufactured by Melles Griot Company, 435 South Pacific Street, San Marcos, Calif. 92069 and is longitudinally mounted within housing 26 with the laser beam output striking mirror 34 which reflects the output beam through aperture 36 at a right angle relative to the longitudinal axis of housing 26. Laser 32 is electrically interconnected via cable 20 with main microcomputer 16 as shown in FIG. 3. Three of the lines in right connector cable 20 include +12 v.d.c. supply line 44, 12 v.d.c. return line 46, and laser control (L.C.) line 48. Central microcomputer 16 controls line 48 to cause laser 32 to selectively go on and off, the purpose of which will be explained further hereinbelow.

Left wheel unit 14 is the same as right unit 12 except that it is left-right reversed in spatial orientation as illustrated in FIG. 1. Left unit 14 includes housing 48, wheel clamp 50, left unit microprocessor 52, laser 54, mirror 56, a laser output aperture (not shown), and phototransistor array 58. The components of left wheel unit 14 are also intercoupled with each other and with central microcomputer 16 in the same way as the corresponding components of right unit 12.

Phototransistor array 38 preferably includes 61 phototransistors Q1–Q61 arranged in two, horizontal, parallel, staggered rows as shown in FIG. 2. The phototransistors within each row are spaced on centers of 0.2 inches and the staggered arrangement of the phototransistors configures the array such that the horizontal spacing between adjacent staggered phototransistors is 0.1 inches. The overall array length is about 6.0 inches.

As illustrated in FIG. 1, the arrangement of the apparatus is such that laser beam 60 emitted from right unit 12 is directed across the front of the vehicle to impinge on array 58 of left unit 14. Similarly, laser beam 62 emitted from left unit 14 impinges array 38 of unit 12. In the preferred configuration, the width of the laser beams 60, 62 is at least about 0.3 inches as they impinge upon the respective arrays 38, 58. Thus, if the center of the laser beam as it impinges on one of the arrays is exactly centered on a given phototransistor, the beam will also impinge upon the two adjacent phototransistors. If, for example, the center of the laser beam impinges halfway between two vertically staggered phototransistors, at least both will be illuminated by the beam. This allows a resolution of 0.05 inches with regard to the impingement location of a laser beam which is half the spacing between phototransistors.

Connection cables 20 and 22 transmit signals between central microcomputer 16 and respective wheel unit computers 30, 52. Central microcomputer 16 is a conventional microcomputer, such as a personal computer, having the capability to generate a display on conventional CRT 18 via electrical connection cable 24. Microcomputer 16 includes a conventional power supply for providing output supply voltages at +12 v.d.c. and +5 v.d.c. to operate right and left computers 30, 52 and right and left lasers 32, 54.

FIGS. 4 and 5 are electrical schematic diagrams illustrating right unit microcomputer 30, it being understood that left unit microcomputer 52 is identical.

Turning now to FIG. 4, right unit microcomputer 30 receives control signals from central microcomputer 16 at terminals CAL, CLK, and LD, and provides an output signal to computer 16 at terminal INFO OUT. Computer 30 also receives power supply voltage at +5 v.d.c. and +12 v.d.c. at the various terminals indicated from central computer 16.

The circuitry of FIG. 4 receives phototransistor data from the phototransistor circuitry of FIG. 5 at terminal PTDATA and provides control signals at terminals CH1–CH3 and S0–S7 to select one of phototransistors Q1–Q61.

More specifically, the circuit of FIG. 4 includes microprocessor U1 (type Z8400PS), address decoder U2 (type SN74LS138), read-only-memory (ROM) U3 (type MSL2764K), random-access-memory (RAM) U4 (type CDM6116), analog-to-digital converter (A/D) U5 (type ADC0801), input-output port (I/O) U6 (type P8255A), and operational amplifier (op. amp.) U7 (type LM324N). Those skilled in the art will appreciate that, for the purposes of drawing clarity, the individual terminals of devices U1–U7 illustrated in FIG. 4 do not correspond exactly with the location of the pins on the actual devices. Additionally, the devices U1–U7 also include other terminals which are unused and therefore not shown, or which are conventionally used such as the connections for the data bus and address bus.

Microprocessor U1 is interconnected via 8-bit data bus 60 with ROM U3, RAM U4, A/D U5, and I/O U6 as shown. Additionally, address bus 62 interconnects the appropriate terminals of microprocessor U1, ROM U3, RAM U4, and I/O U6 as shown. Microprocessor U1 also provides three outputs at address terminals A13, A14, and A15, to terminals A, B, and C of decoder U2 via lines 63, 64, and 65 respectively. Additionally, terminal $\overline{MREQ}$ is connected via line 66 to terminal $\overline{G2A}$ of decoder U2.

Microprocessor U1 provides a read output at terminal $\overline{RD}$ via line 67 to the corresponding terminals of ROM U3, RAM U4, A/D U5, and I/O U6. Similarly, a write output at terminal $\overline{WR}$ is provided via line 68 to the corresponding terminals of RAM U4, A/D U5, and I/O U6.

Microprocessor U1 terminals $\overline{BUS}$ and $\overline{WAIT}$ are clamped high at +5 v.d.c. via line 69 to which grounded parallel capacitors C11 (0.1 MF) and C16 (0.01 MF) are also coupled. Similarly, interrupt terminal $\overline{INT}$ and nonmaskable interrupt terminal $\overline{NMI}$ are clamped high. Reset terminal $\overline{RESET}$ is connected via line 70 to the output of inverter 71. Inverter 71 receives its input from the network including diode 72, resistor R3 (10K ohms), grounded capacitor C2 (33 MF), and inverter 73 intercoupled as shown. This network is provided to provide a slight time delay during power-up according to the time constant of resistor R3 and capacitor C2 to give microcomputer 16 time to stabilize before line 91 INFO OUT goes low to start communications.

Clock signals to microprocessor U1 are presented at terminal CLK at 3.579 megahertz. Input clock signals are developed by the conventional network including crystal 74, grounded capacitors C14 and C15 (33 PF) and resistors R1 and R2 (680 ohms), capacitor C1 (0.1 MF), and inverters 76, 78, and 80, all interconnected as shown in FIG. 4. The clock output from inverter 80 is transmitted via line 79 to terminal CLK of microprocessor U1.

Address decoder U2 provides outputs at terminals Y0, Y1, Y2, and Y3, via lines 80, 81, 82, and 83 respectively to the corresponding terminals $\overline{CS}$ of devices U3-U6. Terminals Vss and $\overline{G2B}$ are connected to ground, and terminals Vcc and G1 are clamped high with grounded capacitor C17 (0.01 MF) connected as shown.

Terminal Vss of ROM U3 is connected to ground and terminals PGM, VDD, and $V_{VB}$ are clamped high and to grounded capacitor C18 (0.1 MF).

Terminal $V_{DD}$ of RAM U4 is clamped high and terminal 12 is connected to ground with capacitors C10 (0.1 MF) and C19 (0.1 MF) connected in parallel between terminals $V_{DD}$ and 12.

Analog-to-digital converter (A/D) U5 receives its primary buffered input at terminal $V_{IN}$ from the phototransistor circuit of FIG. 5 via terminal P.T. DATA. The input to terminal $V_{IN}$ is received via line 84 from the buffer circuit including grounded capacitor C8 (0.0047 MF), resistor R7 (56K ohms), and op-amp U7 (type LM324N) interconnected as shown in FIG. 4. Op-amp U7 receives input power at +12 v.d.c. The power supply to op-amp U7 is also connected to +5 v.d.c. via parallel capacitors C4 (0.4 MF), C5 (6.8 MF), and C13 (0.1 MF), all three of which are connected to ground as shown, and parallel capacitors C6 (0.1 MF) and C7 (6.8 MF) connected to +5 v.d.c. as shown.

Terminal $V_{CC}$ of A/D U5 is clamped high via line 85 which is also connected to parallel grounded capacitors C9 (0.1 MF) and C20 (0.1 MF). Series connected resistors R4 (1K ohms) and R5 (1K ohms) are also connected to line 85 as a voltage divider network to supply +2.5 v.d.c. reference voltage at terminal REF via line 86 as shown in FIG. 4. Terminals VIN(−), D GND, and A GND are connected to ground. In addition, terminal CLK R is connected to one side of resistor R6 (10K ohms). Terminal CLK IN is connected to the other side of resistor R6 to which is also connected grounded capacitor C3 (150 MF).

I/O U6 receives address inputs via address lines A9 and A8 at terminals A0 and A1 respectively. The input to terminal RESET of I/O U6 is low from the output of inverter 73 via line 87 at power up. During startup of the circuit of FIG. 4, the network including resistor R3 and capacitor C2 holds the output on line 87 high and I/O in reset for a short time until the capacitor holds a voltage greater than the switch point of inverter 73. U6 RESET will now be low, normal operation mode.

I/O U6 also receives three inputs—CAL, CLK, and LD, from central microcomputer 16 via lines 88, 89, and 90 at terminals PC6, PC5, and PC4 respectively. I/O U6 terminal $V_{DD}$ is clamped high at +5 v.d.c. with grounded capacitor C21 (0.01 MF) coupled thereto. Terminal $V_{SS}$ is connected to ground.

I/O U6 produces an output at terminal PC3 via line 91 to terminal INFO OUT which is a bit stream delivered to central microcomputer 16, the nature of which will be explained further hereinbelow. I/O U6 also produces two other sets of outputs which are used to select the desired phototransistor output of FIG. 5. The output of the first set is delivered from terminals PC0, PC1, and PC2 via lines 92a, 92b, and 92c to output terminals CH1, CH2, and CH3 respectively. The output of the other set is delivered from terminals PA0, 1, 2, 3, 4, 5, 6, and 7 via lines 93a, b, c, d, e, f, g, and h to output terminals S0, 1, 2, 3, 4, 5, 6, and 7 respectively.

FIG. 5 illustrates the circuitry associated with the 61 phototransistors Q1–Q61 of array 38 (FIG. 2). The phototransistor circuit includes eight mutiplexers (type CD4051) M0, 1, 2, 3, 4, 5, 6, and 7. Multiplexers M2–M6 are not shown for the purposes of drawing clarity, it being understood that these multiplexers are connected in the same way as multiplexer M7 with regard to the associated phototransistors Q14–Q53, eight phototransistors being connected to each multiplexer M2–M6.

Input terminals S0–S7 are connected via lines 93a–h to terminal 6 of each multiplexer M0–M7 in order to select which multiplexer is to transmit data. Lines 93a–h are also each connected to respective grounded resistors Rm (100K ohms). Multiplexers M0–M7 each receive inputs at terminals 9, 10, and 11 from terminals CH1–CH3 via lines 92a–c respectively which serve as a 3-bit input to select one of the phototransistors connected to a selected multiplexer to transmit data.

Each selected multiplexer produces an output at terminal 3 which is transmitted via line 94 to output terminal P.T. DATA. Terminal 16 of each multiplexer M0-7 is clamped high at +5 v.d.c. with terminals 7 and 8 connected to ground.

The collectors of the eight phototransistors associated with each multiplexer M1–M7 are connected to terminals 13, 14, 15, 12, 4, 2, 5, and 1 respectively. In the case of multiplexer M0, only five transistors Q1–Q5 are associated therewith, and the collectors thereof are respectively connected to terminals 12, 1, 5, 2, and 4. Additionally, the collector of each phototransistor Q1–Q61 is connected to a respective current limiting resistor RL (680 ohms) which in turn is connected to +5 v.d.c. The emitter of each phototransistor Q1–Q61 is connected to ground.

One of terminals S0-7 goes high to select the corresponding multiplexer M0-7 to transmit data via line 94 to terminal PT DATA. The bit pattern on lines CH1-3 in turn selects which of the phototransistors associated with the selected multiplexer is to transmit its output via line 94.

By way of operational overview, right unit microcomputer 30 as illustrated in FIGS. 4 and 5 receives data from phototransistors Q1–Q61 and transforms that data into an output bit stream transmitted via line 91 (INFO OUT) to central microcomputer 16. The serial bit stream is a binary word corresponding to the weighted center location of the phototransistors impinged upon by laser 62. Microcomputer 16 then uses the information received from right and left unit microcomputers 30, 52, to calculate the position of one front wheel relative to the other.

Phototransistors Q1–Q61, however, are subject to the effects of ambient light, their own internal bias, and so forth which can produce inaccurate information in the bit stream transmitted via terminal INFO OUT. In order to compensate for these effects, central microcomputer 16 first alters laser beam 62 by turning off laser 54 as controlled via terminal LC and line 48 (FIG. 3). Computer 16 also sends control signals to microcomputer 30 via terminals CAL, CLK, and LD, to cause computer 30 to store values in RAM U4 representative of the outputs of phototransistors Q1–Q61 when beam 62 is off.

Computer 16 then turns on laser 54 and causes computer 30 to place another set of values in a second set of memory locations in RM U4 representative of the outputs of phototransistors Q1–Q61 when beam 62 is on. Computer 30 then uses these first and second sets of values stored in RAM to calculate a third set of values which in part is determined by subtracting the second set of respective values from the first set to eliminate the effects of ambient light, detector bias, and so forth.

The program for computer 30 stored in ROM U3 produces a third set of the values in digital format. As discussed previously, the width of laser beam 62 impinging on array 38 is at least as wide as two horizontally adjacent phototransistors. The digitally formatted binary word transmitted to central computer 16 corresponds to the weighted average center location of the phototransistors impinged upon by laser 62 on array 38. The weighted average can be calculated to the resolution 0.05 inches which is half the phototransistor spacing.

Central computer 16 then uses the information in the bit stream indicating the impingement location of beam 62 to determine the position of wheel 42. With bit stream information from both wheel unit computers 30 and 52, central computer 16 calculates the toe angle of both wheels which is appropriately displayed on CRT 18. The techniques for calculation and programming used in main microcomputer 16 are well known to those skilled in the art.

Figure 6:
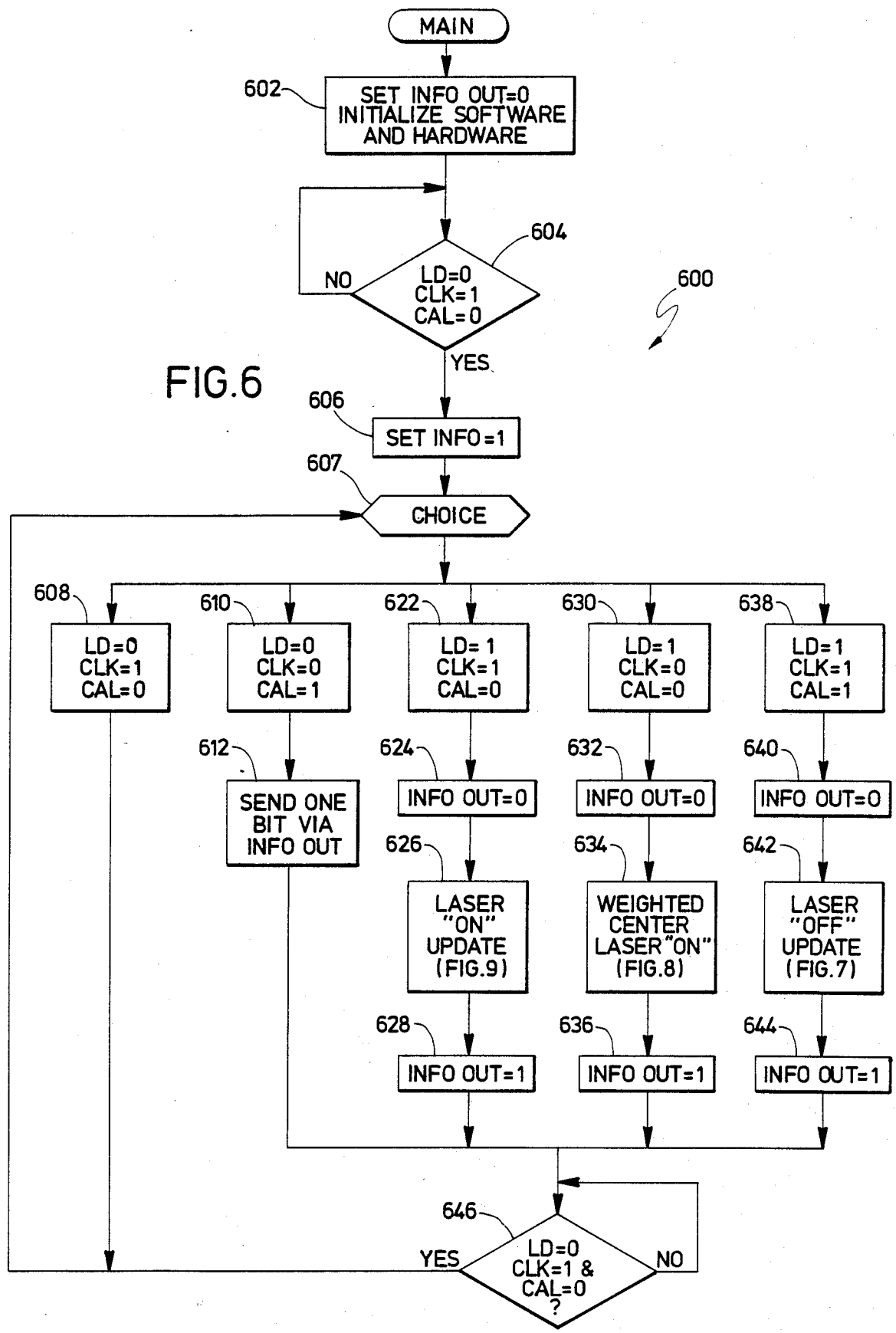
FIG. 6 is a computer program flowchart of the main loop for each of the wheel unit microcomputers of FIG. 1.

FIGS. 6, 7, 8, and 9 illustrate the flowchart for the computer program stored in ROM U3 for operation of right unit microcomputer 30 (and microcomputer 52 also). FIG. 6 illustrates main loop 600 with submodules 700, 800, and 900 illustrated in FIGS. 7, 8, and 9 respectively.

Upon startup, the program enters step 602 (FIG. 6) which sets terminal INFO OUT at zero (logic low or −0. v.d.c.) and initializes the hardware and software variables. The program sets the output INFO OUT at logic low to indicate to central microcomputer 16 that microcomputer 30 is on line but not yet ready to send data.

The program then moves to step 604 and waits until central microcomputer 16 sets input terminal CLK=1 (logic high +5 v.d.c.) and input terminals LD=0 (logic low) and CAL=0 which indicates to microcomputer 30 that main microcomputer 16 is also on line. The program then moves on to step 606 and sets terminal INFO OUT=1 which is a "handshake" to main microcomputer 16 indicating that microcomputer 30 is ready to send data on command.

The program next moves to step 607 to determine the status of LD, CLK, and CAL which in turn determines which subsequent branch of the program is to be executed. If LD=0, CLK=1, and CAL=0 in step 608, which indicates that main microcomputer 16 is not ready for the execution of any of the submodules shown in FIGS. 7, 8, and 9, the program continues to loop through steps 607 and 608 until the conditions of LD=0, CLK=1, and CAL=0 supplied by microcomputer 16 no longer exist.

If central computer 16 sets LD=0, CLK=0, and CAL=1 as determined in step 610, the program moves to step 612 in which computer 30 sends one bit of the 8-bit digital format, binary word via line 91 through terminal INFO OUT to indicate the impingment location of laser beam 62 on array 38. The location of the weighted center of beam 62 relative to the phototransistors is stored as a digitally formated binary word in RAM array "C" which will be explained further hereinbelow.

Upon loading a bit of information at terminal INFO OUT, the program waits in step 646 until LD=0, CLK=1, and CAL=0 and then loops to step 607. This process is repeated until the full binary word is transmitted to computer 16. The binary word is preferably transmitted serially, but the system could be modified for parallel transmission as a matter of design choice.

From time to time, the position of the impinging laser beam stored as the digital format/binary word in RAM array C needs to be updated, preferably at 0.25 to 0.5 second intervals. Accordingly, the program of the central computer 16 turns off laser 54 so that beam 62 does not impinge on array 38 and sets terminals LD=1, CLK=1, and CAL=1 in step 638. Step 640 sets INFO OUT=0, informing central computer 16 that wheel unit computer 30 has seen the command and is about to commence the action required-submodule Laser Off Update in step 642.

The program enters submodule 700 (FIG. 7) at step 702 which sets the software counter PTCTR=1 corresponding to the first phototransistor and selects and reads the first phototransistor.

The first phototransistor is selected by way of I/O U6 (FIG. 4) when terminal S0 goes active thereby selecting multiplexer M0 (FIG. 5) and by setting the appropriate bit pattern at terminals CH1, CH2, and CH3 in order to select phototransistor Q1. Upon selection, the information from phototransistor Q1 is transmitted from multiplexer M0 via line 94, op-amp U7, and line 84 to A/D U5 which converts the data to digital form and impresses it on data bus 60.

Step 704 as indicated above converts the analog signal to a digital value and is stored in RAM U4 array "A". The value "$V_{1i}$" is an 8-bit byte representing the voltage level when laser 54 is off corresponding to the "ith" phototransistor as indicated by the count PTCTR.

RAM U4 is memory mapped into three zones or arrays—"A", "B", and "C". The set of values stored in RAM array "A" is developed during execution of submodule 700 and represents the voltage values of phototransistors Q1–Q61 when laser 54 is off, and is thus representative of the output voltages of phototransistors Q1–Q61 as they are affected by ambient light, their own internal bias, and the like. That is to say, the set of values stored in RAM array "A" represents all of the undesirable effects on the phototransistors except the effect of laser beam 62 because it is off during the execution of submodule 700.

The program then moves to step 706 which asks whether PTCTR equals MAXSCALE 1 indicating that data from all the phototransistors has been processed and entered into RAM array "A". MAXSCALE is the maximum number of phototransistors connected to the system, that is, 61 in the preferred embodiment. If the answer is no, the program moves to step 708 which increments PTCTR for selection of the next phototransistor from which data is to be read and stored. The program continues to loop through steps 704, 706, and 708 until data bytes representing all 61 phototransistors have been stored in RAM array "A".

The program then returns to step 644 (FIG. 6) to set INFO OUT=1 which indicates to central microcomputer 16 that execution of submodule 700 is complete. The program then waits (step 646) until LD=0, CLK=1, and CAL=0 which is a "handshake" acknowledgement from the computer 16. The program then returns to step 607.

After execution of submodule 700, the program of central computer 16 next calls for computer 30 to execute submodule "laser on update" 900 (FIG. 9) by turning on laser 54 and by setting LD=1, CLK=1, and CAL=0 as determined in step 622 whereupon the program of computer 30 moves to step 624 to set INFO OUT=0.

The program then executes the submodule Laser On Update 900 in step 626. The purpose of submodule 900 is to generate a set of data for storage in RAM array "B" which represents the voltage levels of phototransistors Q1–Q61 when the laser beam is on.

Figure 7:
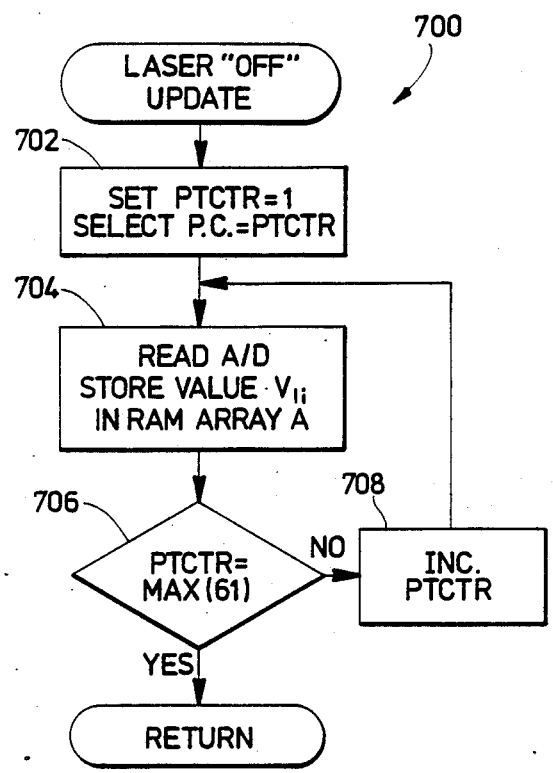
FIG. 7 is a computer program flowchart of a submodule of the main loop of FIG. 6.
Figure 9:
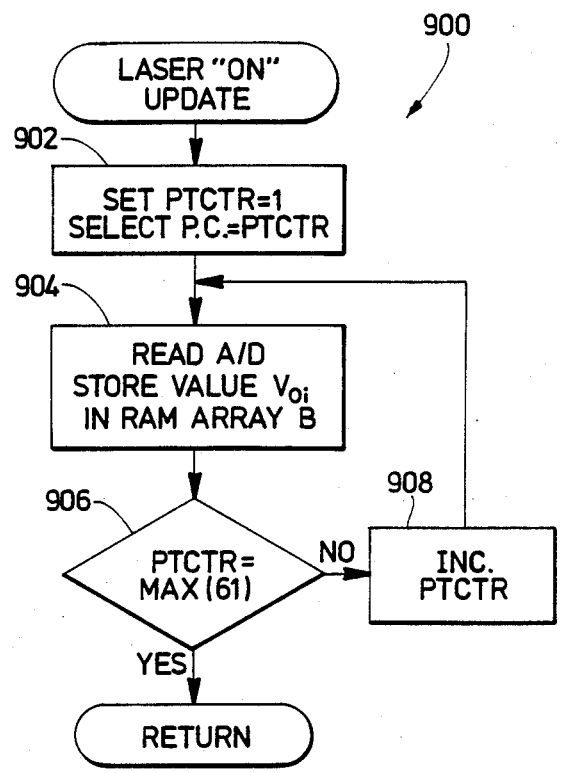
FIG. 9 is a computer program flowchart of a submodule of the main loop of FIG. 6.

The program enters submodule 900 at step 902 which sets the software counter PTCTR=1 corresponding to the first phototransistor Q1 from which data is to be received. The program then causes the hardware by way of I/O U6 to select the phototransistor corresponding to the count on PTCTR through the process described in connection with submodule 700 (FIG. 7). The data from this transistor is then read from A/D U5 and stored at the appropriate location in RAM array "B" in step 904. The value "$V_{0i}$" is an 8-bit byte when the laser is "on" representative of the voltage on "ith" phototransistor corresponding to the count of PTCTR.

Those skilled in the art appreciate that light impinging upon a given phototransistor causes that phototransistor to conduct thereby lowering its output voltage in presently shown design. Accordingly, if laser beam 62 is impinging upon the selected phototransistor, the voltage value will be lower than the voltage value stored in corresponding location of RAM array A when the laser beam was off during execution of submodule 700. Conversely, if laser beam 62 is not impinging upon the selected phototransistor, the voltage value stored in RAM array "B" corresponding to that phototransistor will normally be the same as the corresponding voltage value stored in RAM array A when the laser beam was off. Thus, the value "$V_{0i}$" should not be larger than the corresponding value "$V_{1i}$".

In step 906 the program asks whether PTCTR=MAXSCALE 1 which is 61 in the preferred embodiment. If no, the program increments PTCTR by 1 in step 908 and returns to step 904 to read the next value $V_{0i}$. After all of the $V_{0i}$ values have been entered in RAM array B, step 636 and sets INFO=1 indicating to central computer 16 that execution of submodule 900 is complete. The program then moves to step 646 as previously described and waits until LD=0, CLK=1, and CAL=0.

Figure 8:
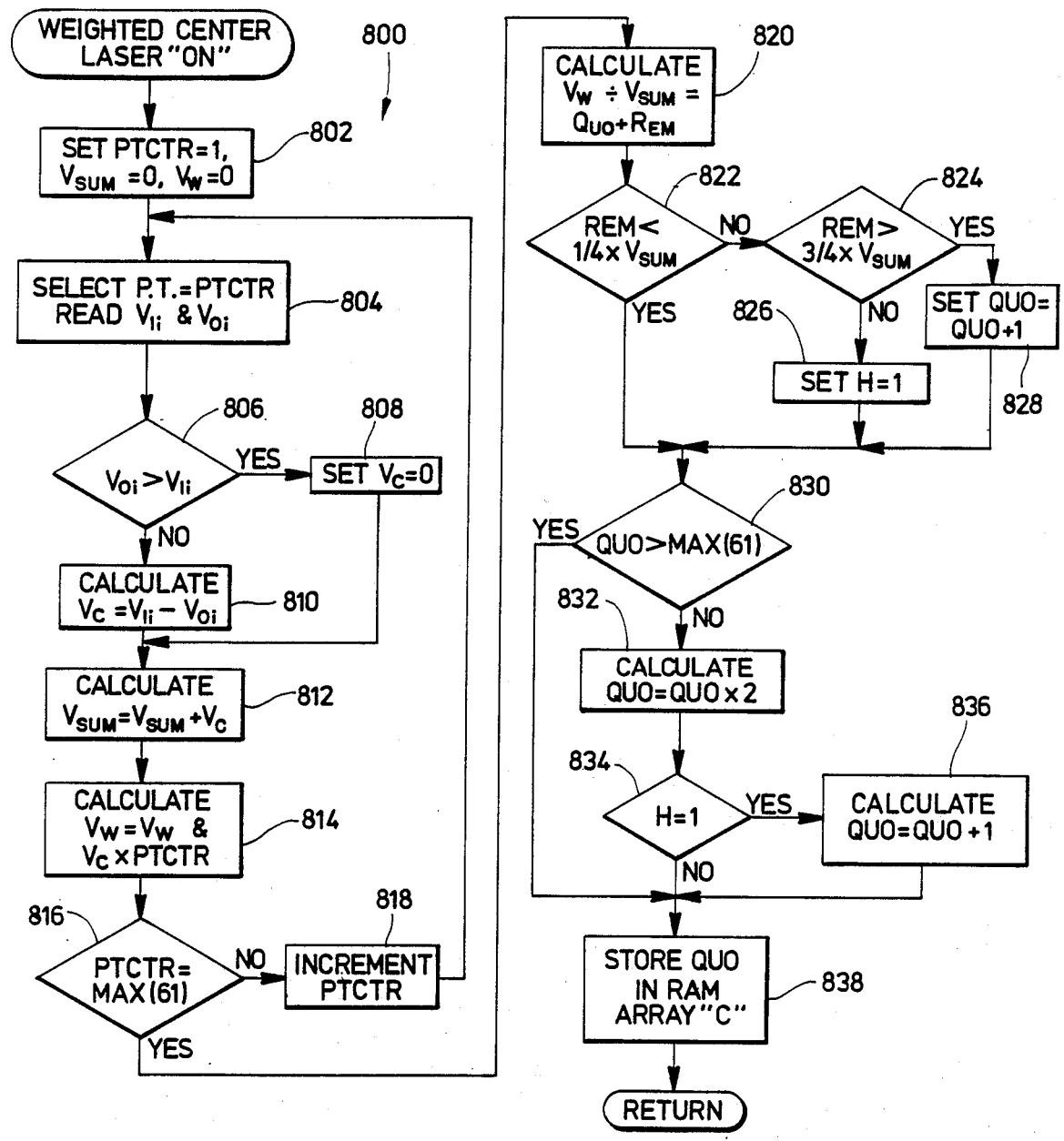
FIG. 8 is a computer program flowchart of a submodule of the main loop of FIG. 6.

Central computer 16 next sets LD=1, CLK=0, and CAL=0 as determined in step 630 to request execution of submodule 800 Weighted Center Laser On (FIG. 8). The program acknowledges in step 632 by setting INFO=0 and moves to step 634 to execute submodule 800.

The purpose of submodule 800 is to use the values $V_{1i}$ and $V_{0i}$, stored in respective RAM arrays A and B during execution of respective submodules 800 and 900 to calulate a third set of values to be stored in RAM array C. This third set of values corresponds to the 8-bit word to be transmitted to computer 16 (as described above) in connection with main loop 600 which indicates or represents the center position of laser beam 62 as it impinges on phototransistor array 38.

The program of computer 30 enters submodule 800 at step 802 which initializes the software variable PTCTR=1 and related variables Vsum=0 and $V_W$=0.

In step 804, the program selects the values $V_{1i}$ and $V_{0i}$ corresponding to the count of PTCTR.

In step 806, the program asks whether the selected value $V_{0i}$ (laser on) is greater than the selected value $V_{1i}$ (laser off). If such is the case, a spurious event has occured and the program sets the software variable $V_c$=0 in step 808. Normally this does not occur, however, the answer in step 806 is no, and the program calculates the difference between $V_{1i}$ and $V_{0i}$ and sets $V_c = V_{1i} - V_{01}$ in step 810. Note that most of the phototransistors Q1–Q61 were not impinged upon during execution of submodule 900. As a result, the difference $V_C$ will be 0 for most of the calculations $V_{1i}$ and $V_{0i}$.

The program then moves to step 812 to calculate the software variable $V_{SUM}$ which is the running total of $V_{SUM}$ plus the newly calculated $V_C$. That is to say, the variable $V_{SUM}$, when complete, represents the sum of all the differences between corresponding values in RAM arrays A and B.

The program then moves to step 814 which calculates another software variable $V_W$ which is the weighted sum of all of the values $V_C$ times the corresponding count PTCTR.

Next, step 816 asks whether counter PTCTR equals MAXSCALE 1 (i.e., 61 in the preferred embodiment) indicating that calculations have been completed corresponding to all 61 of the phototransistors. If the answer is no, the program moves to step 818 to increment PTCTR and loops back to step 804 until PTCTR=61 and then moves to step 820.

As an example for step 820, assume laser beam 62 is impinging about halfway between phototransistors Q2 and Q3. Further assume that $V_C$ for Q2 ($V_{12} - V_{02}$) equals 1.3 volts and $V_C$ for phototransistor Q3 ($V_{13} - V_{03}$) equals 1.1 volts. Accordingly, $V_{SUM}$ is 1.3 plus 1.1 equals 2.4. Correspondingly, $V_W$ equals 1.3×2 plus 1.1×3 for a total of 5.9. $V_W$ divided by $V_{SUM}$ is 5.9 divided by 2.4 which is a quotient (QUO) of 2 plus a remainder (REM) of 1.1 in step 820.

Having made these calculations, the program moves to step 822 which asks whether remainder REM is less than one-fourth of $V_{SUM}$ in order to determine whether the center of a laser beam is closer to Q2, Q3, or to the centerline inbetween. In the example above, one-fourth of $V_{SUM}$ equals 0.6, the remainder of 1.1 is not less than 0.6, and the answer to step 822 is no. Thus, the center of the laser beam is not closer to Q2 than to Q3 or to the centerline therebetween.

The program then moves on to step 824 which asks whether the remainder is greater than three-fourths of $V_{SUM}$ (1.8). Since the remainder is not greater than 1.8 in the example, the answer in step 824 is no and the program moves to step 826 to set the software variable "H"=1, which indicates that the center of the laser beam is closer to the centerline between phototransistors Q2 and Q3 than to either of them.

If the answer in step 824 is yes, which indicates that the center of the laser beam is closer to Q3 than to either Q1 or centerline inbetween, the program moves to step 828 to increment QUO by 1.

After steps 826 or 828, the program moves to step 830 which asks whether the software variable QUO is greater than MAXSCALE 1 (61) indicating that some error has occured in which case the program exits submodule 800 and returns to the main loop 600.

If the answer in step 830 is no, the program moves on to step 830 to set QUO=QUO×2, the purpose of which will be explained hereinbelow.

The program then moves on to step 834 which asks whether the software variable H=1 (set in step 826). The variable H equals 1 only if the laser beam is impinging at a location closer to the centerline between to adjacent phototransistors than to either of them. In the example above, H=1, the answer in step 834 is yes and step 836 sets QUO=QUO+1.

After step 836, or after step 834 if the answer is no, the program stores the final value for QUO in RAM array C as an 8-bit binary word.

The purpose of doubling QUO in step 832 is to avoid the use of a fraction if a remainder exists by setting H=1 in step 834. In the example, QUO in step 820 equals 2, QUO in step 832 equals 4, and final QUO in step 836 equals 5 which is the value stored and then transmitted as an 8-bit binary word (00000110) to central computer 16. The program of computer 16 divides QUO by 2 which equals 2.5 in the example, which indicates that the center of the laser beam 62 is impinging array 38 at the location 2.5 which is halfway between phototransistors Q2 and Q3 within the resolution of the system. If laser beam 62 were centered on Q3 instead, for example, QUO would equal 6, half of which is 3 corresponding to Q3.

In this way, the resolution of the system is one-half the horizontal distance between two adjacent phototransistors which is 0.05 inches in the preferred embodiment.

After step 838, the program returns to main loop 600 at step 636 to set INFO OUT=1 which indicates that execution of submodule 800 is complete. The program waits in step 646 until LD=0, CLK=1, and CAL=0.

Those skilled in the art will appreciate that the present invention encompasses embodiments other than those preferred and described herein. For example, the source of electromagnetic radiation can be a beam of light generated by conventional, non-laser means, or even a beam of microwaves. Additionally, photodetector array could be any array of detectors such as photodiodes appropriate for the beam of electromagnetic radiation impinging thereon. Furthermore, while the preferred embodiment discloses separate microcomputers 30, 52 associated with each array, the functions of both could be incorporated as part central microcomputer 16. Also, the electromagnetic beam could be blocked and unblocked by a mechanical device or an optical switch or could be altered between higher and lower intensity levels rather than being turned off then on again. Finally, the present invention is not limited to use in the context of vehicular wheel alignment, but is generally applicable for determining the position of an object, the object being associated with either the source of electromagnetic radiation or the detector array.

Those skilled in the art will also appreciate that the components of the preferred embodiment can easily incorporate additional components for aligning the rear wheels of a vehicle with the front steerable wheels. For example, laser beam 60 can be split and a portion directed toward a mirror connected to the corresponding rear wheel for reflection back to another phototransistor array included as part of wheel unit 12. This additional array can then be interconnected to microcomputer 30 for determining the alignment of the rear wheel in the manner that described herein for aligning the front wheels.

Having thus described the preferred embodiments of the present invention, applicant claims the following as new and desired to be secured by Letters Patent:

1. An apparatus for determining the position of an object, comprising:
   a source of an electromagnetic radiation beam;
   an array of spaced, electromagnetic radiation beam detectors for said beam, each detector including detector signal producing means associated therewith for producing a variable magnitude detector signal in response to the intensity of electromagnetic radiation impinging thereon, said detector signal being subject to a signal bias due to the effects of ambient light, detector bias, or the like;
   means mounting one of said source and array in a fixed relationship relative to said object;
   structure for locating the other of said source and array in a fixedly spaced relationship relative to said object and in an orientation for impingement of said beam on said array;
   altering means for selectively altering the intensity of said source-derived electromagnetic radiation impinging on said array between relatively lower and higher intensities whereby each of said detector signal-producing means associated with said detectors produces respective corresponding first and second detector signals;
   digital converting means coupled with said detector signal producing means for receiving said first and second signals and for converting said signals into respective, corresponding, first and second digital signals; and
   digital signal processing means coupled with said converting means and including digital memory means for receiving said first and second digital signals and for storing respective first and second data sets representative thereof in said memory means,
   said processing means including means for retrieving and comparing said data sets to one another for producing an output data set representative of the difference therebetween and thereby representative of respective detector signals without said signal bias and for producing an output signal indicative of the location of said beam relative to said array wherein said location is indicative of the position of said object relative to one of said source and array.

2. The apparatus as set forth in claim 1, said electromagnetic radiation including visible light.

3. The apparatus as set forth in claim 1, said beam detectors including phototransistors.

4. The apparatus as set forth in claim 1, said processing means including a microcomputer.

5. The apparatus as set forth in claim 1, wherein the resolution of the location of said beam relative to said array is equal to one-half the spacing between said detectors.

6. The apparatus as set forth in claim 1, the object including a first steerable wheel of a vehicle,
   said mounting means mounting said array in fixed relationship relative to first wheel,
   the vehicle including a second steerable wheel,
   said locating structure locating said source in a fixed relationship relative to the second wheel and thereby in a spaced relationship relative to the first wheel.

7. The apparatus as set forth in claim 6, said apparatus further comprising:
a second one of said beam source;
a second one of said array;
means mounting said second array in a fixed relationship relative to the second wheel,
structure locating said second beam source in a fixed relationship relative to the first wheel,
said altering means including means for altering said second source-derived electromagnetic radiation impinging on said second array whereby each of said detector signal-producing means associated with the detectors of said second array produces corresponding first and second detector signals,
a second one of said digital converting means for receiving and converting said first and second signals from said second array into respective, corresponding, first and second digital signals from said second array; and
a second one of said processing means for receiving said second digital signals and for storing respective first and second data sets representative thereof and for producing a respective second output data set.

8. The apparatus as set forth in claim 7, further including means for receiving said respective output signals and in response for determining the toe angle of the steerable wheels, and responsive display means coupled with said determining means for providing a visual display of said toe angle.

9. The apparatus as set forth in claim 7, said sources including respective lasers.

10. The apparatus as set forth in claim 7, said altering means including means operably coupled with said sources for selectively turning off said respective sources for producing said lower intensity levels and for producing said lower intensity levels and for selectively turning on said sources for producing said higher intensity levels.

11. The apparatus as set forth in claim 7, said determining means and said display means respectively including a microcomputer and a cathode ray tube.

12. The apparatus as set forth in claim 1, said processing means including means assigning a positional weighted designation to each of said detectors and means for determining a value weighted in accordance with the positional designation of the detectors on which said beam impinges, said output signal being representative of said value.

13. The apparatus is set forth as in claim 1, said array including structure configurating said detectors into at least one row, said processing means including means for producing said output data set representative of a location of said beam relative to said array to the nearest of one of adjacent detectors and the midpoint there between thereby providing a resolution of the location of said beam to one half the space in between adjacent detectors.

14. The apparatus is set forth in claim 13, said array including 2, adjacent, staggered rows of detectors with adjacent detectors in respective rows.

15. A method of determining the position of an object, comprising the steps of:
providing a source of an electromagnetic radiation beam;
providing an array of spaced electromagnetic radiation beam detectors for said beam, each detector including detector signal producing means associated therewith for producing a variable magnitude detector signal in response to the intensity of electromagnetic radiation impinging thereon, said detector signal being subject to signal bias due to the effects of ambient light, detector bias, or the like;
mounting one of said source and array in a fixed relationship relative to said object;
locating the other of said source and array in fixedly spaced relationship relative to said object and in an orientation for impingement of said beam on said array;
altering the intensity of said source-derived electromagnetic radiation impinging on said array between relatively lower and higher intensities whereby each of said detector signal producing means associated with said detectors produces respective corresponding first and second detector signals;
converting said first and second signals into respective corresponding first and second digital signals;
storing respective first and second data sets representative of said digital signals in digital memory means; and
retrieving and comparing said data sets to one another for producing an output data set representative of the difference there between and thereby representative of respective detector signals without said signal bias and in order to produce an output signal indicative of the location of said beam relative to said array wherein said location is indicative of the position of said object relative to one of said source and array.

* * * * *